United States Patent [19]

Tempelhof

[11] Patent Number: 5,101,357
[45] Date of Patent: Mar. 31, 1992

[54] NAVIGATION DATA STORAGE ON COMPACT DISK

[75] Inventor: Alfred Tempelhof, Hildesheim, Fed. Rep. of Germany

[73] Assignee: Robert Bosch GmbH, Stuttgart, Fed. Rep. of Germany

[21] Appl. No.: 468,703

[22] Filed: Jan. 23, 1990

[30] Foreign Application Priority Data

Feb. 14, 1989 [DE] Fed. Rep. of Germany ....... 3904344

[51] Int. Cl.$^5$ .............................................. G06F 15/50
[52] U.S. Cl. ............................. 364/449; 364/424.05; 340/990; 340/995
[58] Field of Search .......... 364/449, 443, 444, 424.01, 364/424.05; 340/990, 995

[56] References Cited

U.S. PATENT DOCUMENTS

| | | | |
|---|---|---|---|
| 4,502,123 | 2/1985 | Minami et al. | 364/449 X |
| 4,613,913 | 9/1986 | Phillips | 360/51 |
| 4,646,015 | 2/1987 | Phillips | 324/253 |
| 4,686,642 | 8/1987 | Buxton et al. | 364/607 |
| 4,734,863 | 3/1988 | Honey et al. | 364/449 |
| 4,758,959 | 7/1988 | Thoone et al. | 364/449 X |
| 4,788,645 | 11/1988 | Zavoli et al. | 364/449 |
| 4,796,100 | 1/1988 | Sakaguchi | 358/342 |
| 4,796,191 | 1/1989 | Honey et al. | 364/450 |
| 4,849,827 | 7/1989 | Hashimoto et al. | 364/449 X |
| 4,876,651 | 10/1989 | Dawson et al. | 364/449 |
| 4,984,168 | 1/1991 | Neukirchner et al. | 364/449 |

*Primary Examiner*—Thomas G. Black
*Assistant Examiner*—Thomas S. Auchterlonie
*Attorney, Agent, or Firm*—Frishauf, Holtz, Goodman & Woodward

[57] ABSTRACT

A vehicular navigation and data retrieval system features, on-board, a navigation system (1) and a compact disk (CD) player (2) coupled to said navigation system and adapted to hold, and selectively retrieve data from, at least one audio CD (3) and at least one navigation data CD. A method of retrieving, from disk, navigation data for use by said navigation system (1), features the steps of determining whether said navigation system has an intermediate need for navigation data from said data CD (4), discriminating when said CD player (2) is playing an audio selection from said audio CD (3) and when said player is in a pause adjacent to an audio selection, and directing said CD player (2) to cease playing said audio CD (3) and start retrieving navigation data from said data CD only when said player is in a pause, unless said navigation system has said immediate need and, in the event of such need, interrupting said audio selection to permit navigation data retrieval. This method minimizes disturbing interruptions of the playing of music or other audio selections.

10 Claims, 2 Drawing Sheets

NAVIGATION DATA STORAGE ON COMPACT DISK

Cross-reference to related U.S. patents and applications, the disclosures of which are hereby incorporated by reference: NEUKIRCHNER et al., U.S. Ser. No. 190,239, filed May 2, 1988, now U.S. Pat. No. 5,040,122, issued Aug. 13, 1991; KNOLL et al., U.S. Ser. No. 07/274,654, filed Nov. 21, 1988, now U.S. Pat. No. 4,888,699, issued Dec. 19, 1989; NEUKIRCHNER et al., U.S. Ser. No. 307/088, filed Jan. 24, 1989, now U.S. Pat. No. 4,984,168, issued Jan. 8, 1991;

| | |
|---|---|
| 4,613,913, PHILLIPS; | 4,788,645 Zavoli et al.; |
| 4,646,015, PHILLIPS; | 4,796,191, HONEY et al.; |
| 4,686,642, BUXTON et al.; | |
| 4,734,863, HONEY et al. | |

Cross-reference to related literature: Bosch Technical Reports, Vol. 8, No. 112, pages 12-14 (1986); "Cars That Know Where They're Going", by Robert French, The Futurist (May-June 1989).

The present invention relates generally to storage of navigation data on compact disk, and, more particularly to use of a multi-disk player, and retrieval of navigation data during pauses in the playback of audio information.

BACKGROUND

Bosch Technical Reports, Vol. 8, No. 112, pages 12-14 (1986) disclose a compact disk read-only memory (CD-ROM) on which map data are stored. It is intended that these CD-ROM data will be retrieved using a CD player installed in a motor vehicle and transmitted to the vehicle's positioning and navigation system.

So-called "CD-changers" are known, which have a magazine holding multiple compact disks, any of which the player can select and play. For example, the magazine can simultaneously hold a music or other audio disk and a navigation data disk; when retrieval from a data disk is required, the playing of the audio disk can be momentarily interrupted.

THE INVENTION

The method of the present invention for reading of navigation data from compact disk by reading mainly during audio playback pauses has the advantage that the same CD-changer can be used to play both the audio CD and the navigation data CD. It is particularly advantageous that loading of navigation data into the navigation system from the CD occurs only during pauses of audio CD, such as between songs on an album. This avoids the annoying interruptions which would otherwise occur, if the CD changer were programmed or directed to immediately switch to data retrieval mode whenever the navigation system called for more data.

Another useful feature of the invention is that the system recognizes a pause in audio play, for example, at the end of a musical selection, by evaluating the digital data stream or the audio-frequency signal from the amplifier. This evaluation can be done by a simple integration circuit, for example.

In order to optimally use playback pauses, it is desirable to run preparatory READ cycles from the navigation data disk to another storage medium, for example, a Random Access Memory (RAM) of the positioning and navigation system. Just as computer systems with cache memory operate faster, a navigation system with RAM storage will operate faster if most of the data needed next can be retrieved without waiting for a disk to be spun to the relevant sector.

Pause recognition is sometimes difficult, especially in the case of recordings of spoken text, so it is another feature of the invention to evaluate the running time data which is typically recorded in the "subheader" extra tracks of the disk. Thus, the system can determine the remaining running time of the current music or spoken text selection, and the listener is spared wondering why the CD player is stopping in the middle of Robert Frost's poem "Stopping by Woods". Instead, the system waits for the audio selection to finish, then switches to data retrieval mode.

Yet another feature of the invention is that, after the data retrieval cycle is completed, the playback of the audio disk is resumed just where it left off. In this way, the playback pauses will not be perceived as disturbing interruptions.

Still another feature is that the system can be programmed to detect when a playback pause exceeds a predetermined period and, if so, to restart the music on the audio disk at the beginning, so that the selection can be heard in its entirety.

DRAWINGS

These and other features and advantages of the invention will be apparent from the drawings, of which:

DETAILED DESCRIPTION

Figure 1:
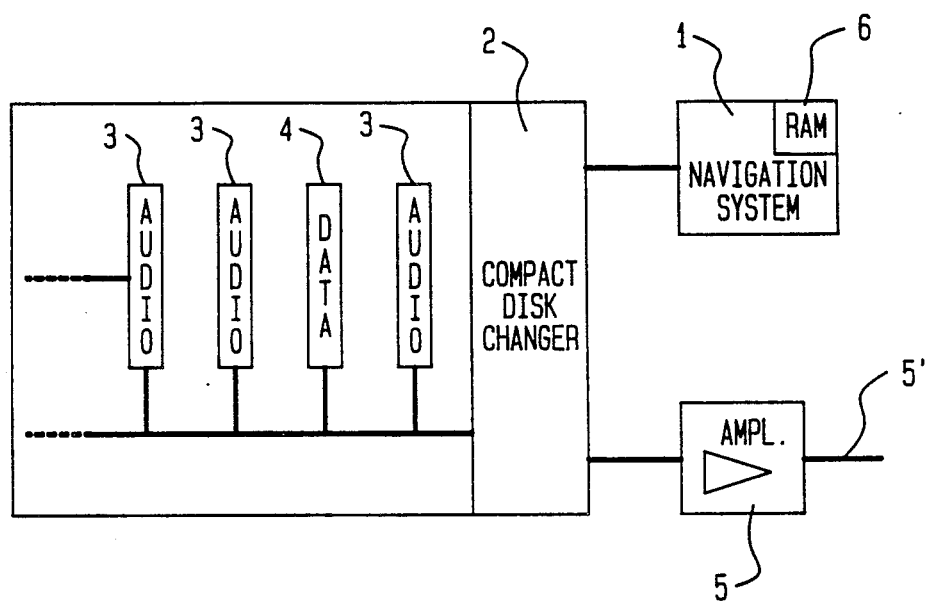
FIG. 1 is a schematic diagram of an apparatus for carrying out the method of the invention.

FIG. 1 illustrates a positioning and navigation system 1 which is connected by data lines or buses to a CD-changer multi-disk player 2. CD-changer 2 contains a plurality of audio compact disks 3 and at least one navigation data disk 4. An output amplifier 5 is provided. A number of suitable navigation systems, such as those referenced in the introduction above, are known in the art. CD players capable of reading both audio disks and data disks are also known in the art.

The CD-changer 2 operates like a conventional CD player, with the difference that it has multiple compact disks 3, 4 ready in its magazine for play. The mounting and changing of the compact disks 3,4 occurs automatically and without manual influence of the user or listener CD-changer 2 has keys or switch means for selecting a particular compact disk 3 or music title. After selection of the music title, the CD-changer 2 places the desired audio compact disk 3 in its play slot and directs its READ head to the starting point of the track of the programmed music title. It is typical for an audio compact disk to have up to 99 tracks on which music pieces can be stored. Further, the compact disk has extra (sub-header) tracks which assure the proper administration and control of playback. Thus, one can check in an extra track (Subcode-Channel-P) whether a playback pause is present at the moment. Also, another extra track (Subcode-Channel-Q) indicates the total playing time of the selection currently being played. By measuring the elapsed time of the current playback and subtracting this from the total playing time, one can determine the playing time remaining until the next pause.

Figure 2:
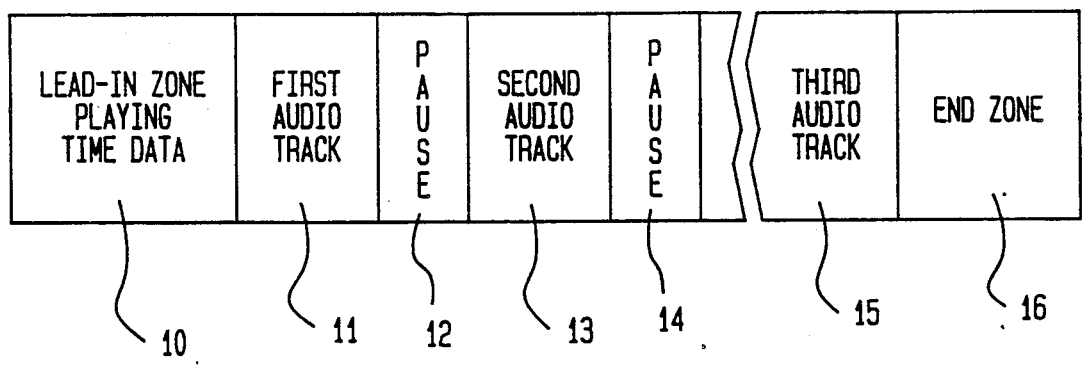
FIG. 2 illustrates the track organization on the CD.

FIG. 2 illustrates a radial slice of recorded tracks 11, 13, 15 and intermediate blanks or pauses 12, 14 of about 2 seconds each. Before first track 11, a lead-in zone 10 is provided which contains, among other things, the data for the respective positions of tracks 11, 13, 15. With the aid of these data, the remaining playing time until the next pause can be calculated. In zone 16, the end of the data is reached.

If the positioning and navigation system 1 wants to read navigation data from the navigation data disk 4, it sends a corresponding READ command to CD-changer 2. To prevent the READ head of CD-changer 2 from immediately ceasing read-out of audio data, independently of its instantaneous playing position on audio disk 3, and thereby interrupting the musical piece, the READ command is delayed. To the extent feasible, it is delayed until a playback pause is at hand, i.e. until the track being played comes to the end. Since the remaining playing time of the current track is, as noted above, easily calculated, the delay of the READ command until the end of play can be carried out by simple and well-known means. During this playback pause, a switch to navigation data disk 4 is made. As long as data are being read from the navigation data disk, the playing of a new audio CD 3 is blocked.

After the end of the navigation data being read is recognized, the player switches back to audio playback mode and resumes the previously-underway audio compact disk 3. If desired, the system can be programmed to repeat the last music piece from the beginning. If this is not desired, then playing of the next track and the next piece of music is carried out.

Figure 3:
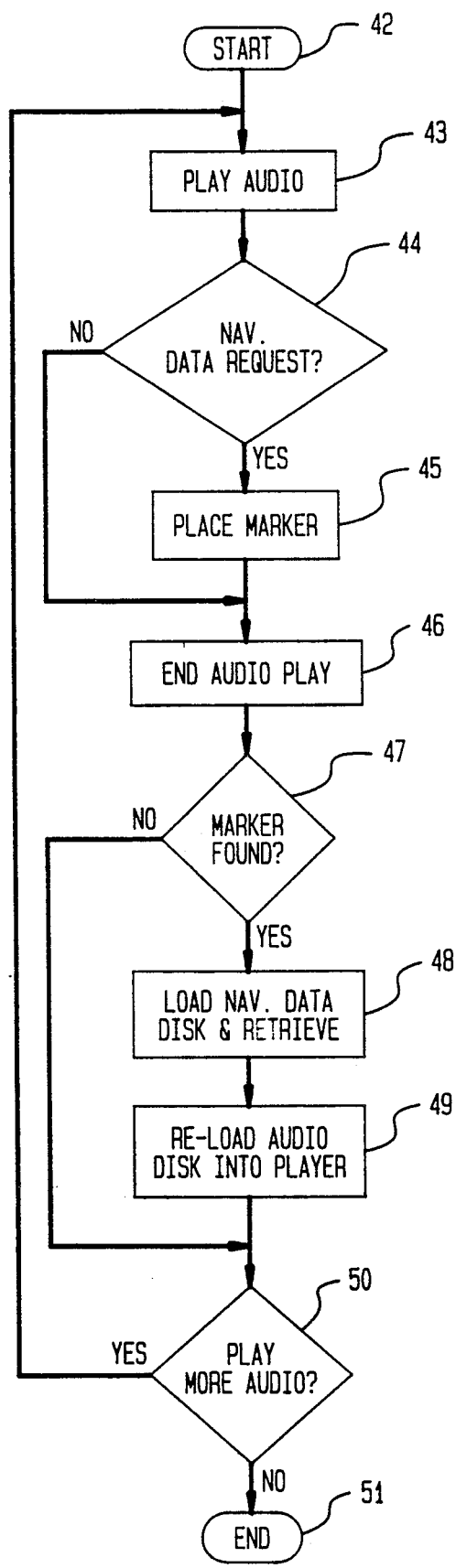
FIG. 3 is a flowchart of the method of the invention.

FIG. 3 is a flowchart of the steps in the method of the invention. After the start in step 42, CD-changer 2 loads the desired audio disk 3 and, in step 43, plays the desired piece of music until the pause at step 46. If, in the meantime, the navigation system makes a request for data (step 44), the CD-changer 2 places a marker or sets a flag in step 45; otherwise, the result of the test at step 44 is NO and step 45 is skipped over.

At step 46, the beginning of the playback pause, a test is made at step 47 for recognition of the aforementioned marker; if the result is YES, at step 48 the navigation data disk is loaded and the requested data is read into the navigation system.

In step 49, after the end of the data retrieval, the previous audio CD is loaded. At step 50, the user is asked whether playing of a new music title is desired; if NO, playback of audio compact disks is terminated at step 51; otherwise, program execution returns to step 43 with the new selection.

The positioning and navigation system 1 cannot always wait until the next playback pause of the audio CD 3. One can therefore also retrieve, during pauses, navigation data which are not immediately required, but which are to be stored in RAM as an interruption-prevention measure, until they are needed. For example, if one has already driven to the edge of a first section of the map, as displayed on a monitor of the navigation system, one can preventively read into RAM the next adjacent section of the map, in the direction of the destination. Shortly before the end of the first map section, the navigation system will switch over to the next section by taking the necessary data directly from RAM. Thus, the switchover can be carried out without interrupting any audio CD in progress.

According to a further feature of the invention, the positioning and navigation system 1 can send CD-changer 2 a preparatory command to take the next opportunity to retrieve data from disk, to load specific data into RAM. Various preparatory commands, graded according to urgency, can be sent, to be interpreted according to urgency by CD-changer 2. As an indicator of urgency, one can use the proportion of the route which remains to the edge of the currently retrieved data and/or the vehicle speed. Thus, the greatest urgency or immediate need would be indicated by the route already covered reaching the edge of the currently retrieved map data.

In the case of the greatest level of urgency, the running of the audio CD would be immediately interrupted to allow loading of additional navigation data. The break-off point is stored, so that later the interrupted piece of music can be resumed at that point, or a new music title played.

Another method for evaluating or recognizing pauses is by evaluating the audio-frequency amplifier 5'. By monitoring the output signal, e.g. picked up at the output amplifier 5 of the CD-changer 2, one can readily determine whether a pause is present. One cannot switch over to the data disk at every pause, so it is desirable to establish a predetermined minimum time for detection of a pause. Only when this minimum period is exceeded does the system switch from audio disk to data disk. It is desirable to include continual measurement of signal level to help recognize pauses unambiguously. The measurement of audio frequency signal levels, per se, is well known in the art and does not form part of the present invention, and therefore need not be further elaborated.

Various changes are possible within the scope of the inventive concept.

I claim:

1. In a vehicular navigation and data retrieval system including on-board
    a navigation system (1) and
    a compact disk (CD) player (2) coupled to said navigation system and adapted to hold, and selectively retrieve data from, at least one audio CD (3) and at least one navigation data CD,
    a method of retrieving, from disk, navigation data for use by said navigation system (1),
    comprising the steps of:
    determining whether said navigation system has an immediate need for navigation data from said data CD (4), that is, whether vehicle position has reached an edge of a map section previously stored in said navigation system;
    discriminating, from data stored on said audio CD, when said CD player (2) is playing an audio selection from said audio CD (3) and when said player is in a pause adjacent to an audio selection; and
    directing said CD player (2) to cease playing said audio CD (3) and start retrieving navigation data from said data CD only when said player is in a pause, unless said navigation system has said immediate need and, in the event of such need, interrupting said audio selection to permit navigation data retrieval.

2. Method according to claim 1, wherein
    said discriminating step is accomplished by evaluating whether digital data retrieved from a subheader track on said disk by said player (2) indicates a pause has been reached.

3. Method according to claim 1, wherein said discriminating step is accomplished by evaluating whether an audio-frequency output signal from said player (2) has remained below a predetermined amplitude threshold for a predetermined minimum period of time.

4. Method according to claim 1, wherein
said discriminating step comprises
reading from said audio CD (3) total track playing time data (10),
measuring elapsed track playing time, and
comparing said elapsed time and said total track playing time until these times are equal and thereby determining when a track has been totally played and a pause has been reached.

5. Method according to claim 1, further comprising resuming playing of any interrupted audio selection, upon completion of navigation data retrieval, from the point where playing was interrupted.

6. Method according to claim 1, further comprising completing data retrieval from said data CD (4) and resuming playing of any audio CD (3) which was being played prior to to said data retrieval.

7. In a vehicular navigation and data retrieval system including on-board
a navigation system (1) and
a compact disk (CD) player (2) coupled to said navigation system and adapted to hold, and selectively retrieved data from, at least one audio CD (3) and at least one navigation data CD,
a method of retrieving, from disk, navigation data for use by said navigation system (1),
comprising the steps of:
determining whether said navigation system has an immediate need for navigation data from said data CD (4), that is, whether vehicle position has reached an edge of a map section previously stored in said navigation system;
discriminating, from data stored on said audio CD, when said CD player (2) is playing an audio selection from said audio CD (3) and when said player is in a pause adjacent to an audio selection; and
directing said CD player (2) to cease playing said audio CD (3) and start retrieving navigation data from said data CD only when said player is in a pause, unless said navigation system has said immediate need and, in the event of such need, interrupting said audio selection to permit navigation data retrieval; and
further comprising the step of
preventively reading navigation data, representing a next adjacent section of a map, in the direction of a destination, during audio playback pauses, from said data CD (4) into a memory (6) of said navigation system, before said system has said immediate need.

8. Method according to claim 7, wherein
said step of preventively reading comprises reading into a Random Access Memory (RAM).

9. Vehicular on-board navigation and data retrieval system including
a navigation system (1) and
a compact disk (CD) player (2) coupled to said navigation system and adapted to hold, and selectively retrieve data from, at least one audio CD (3) and at least one navigation data CD,
means for communicating requests from said navigation system (1), for navigation data stored on said data CD (4), to said CD player (2),
means for discriminating, from subheader track data stored on said audio CD, when said CD player (2) is playing an audio selection from said audio CD (3) and when said player is in a pause adjacent to an audio selection; and
means for directing said CD player (2) to cease playing said audio CD (3) and start retrieving navigation data from said data CD when said player is in a pause.

10. System according to claim 9, further comprising
a Random Access Memory (RAM) (6) in said navigation system (1) and
means for preventively reading navigation data, during audio playback pauses, from said data CD (4) into said RAM (6) of said navigation system (1) before said navigation system has an immediate need for said navigation data, that is, before the vehicle position reaches an edge of a map segment previously stored in the navigation system.

* * * * *